No. 784,565. PATENTED MAR. 14, 1905.
G. J. HOSKINS.
JOINT FOR THE LOCKING BAR TYPE OF ROLLED IRON PIPES.
APPLICATION FILED SEPT. 22, 1902.
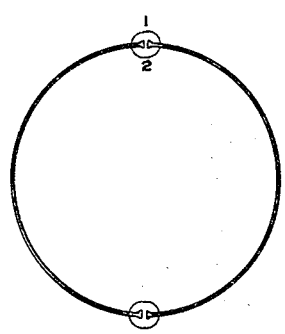
Fig: 1
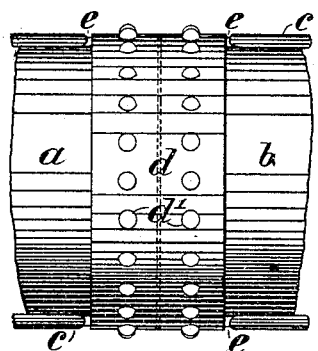
Fig: 2
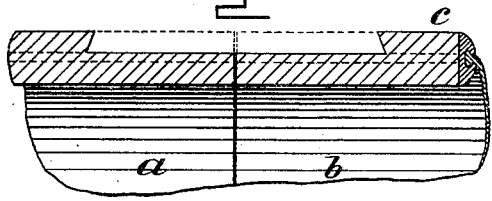
Fig: 3
Fig: 4
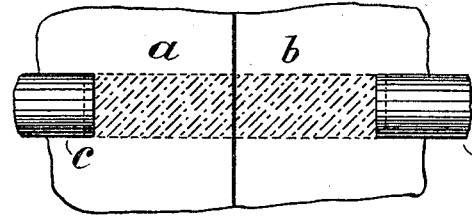
Fig: 5
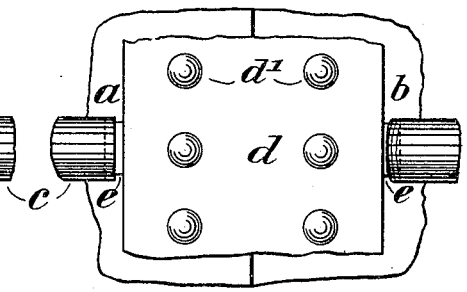
Fig: 6
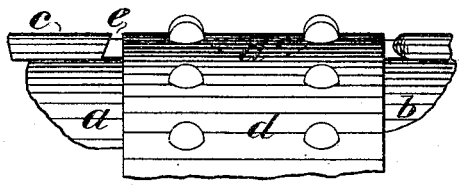
Fig: 7
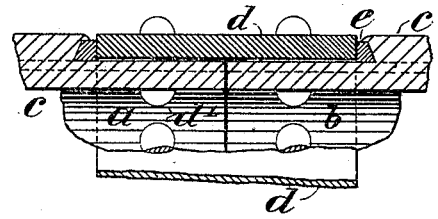
Fig: 8
WITNESSES:
INVENTOR.
George John Hoskins
BY
ATTORNEYS.

No. 784,565. Patented March 14, 1905.

UNITED STATES PATENT OFFICE.

GEORGE J. HOSKINS, OF ULTIMO, SYDNEY, NEW SOUTH WALES, AUSTRALIA.

JOINT FOR THE LOCKING-BAR TYPE OF ROLLED IRON PIPES.

SPECIFICATION forming part of Letters Patent No. 784,565, dated March 14, 1905.

Application filed September 22, 1902. Serial No. 124,373.

*To all whom it may concern:*

Be it known that I, GEORGE JOHN HOSKINS, a subject of the King of Great Britain and Ireland, and a resident of Wattle street, Ultimo, Sydney, in the State of New South Wales, Australia, have invented a certain new and useful Improved Joint for the Locking-Bar Type of Rolled Iron Pipes, of which the following is a specification.

Special joints have from time to time been devised for joining the ends of two adjacent rolled iron pipes of the locking-bar type, the principal one consisting of attaching a special form of socket end to one pipe, then introducing the spigot end of the other pipe into it and securing it with lead in a manner that is well known.

The present invention consists in placing a collar round the point of junction between the two pipes; but owing to the locking-bars being present the ends of the pipes have to be specially treated in order to make the joint a good one. The locking-bars project like ribs from the external surface of the pipe, and consequently the collar will not sit evenly upon the adjacent ends of the two pipes. In order to overcome this difficulty, the extreme outside ends of the locking-bars (on each pipe) are planed down flush with the surface of the pipe and slightly undercut. The jointing-ring may then be made perfectly cylindrical. The ends of the two pipes will be punched with rivet-holes. The ends of the adjacent pipes will be inserted into the collar and riveted thereto. Wedges are driven into the spaces between the undercut ends of the locking-bars and the edges of the collar. The ends of the locking-bars are then swaged or beaten down, so as to partially envelop the wedges, and the exposed edges of the collar are calked in the usual way, as is well understood by boiler-makers; but in order that the invention may be properly understood reference is made to the accompanying sheet of drawings, in which—

Figure 1 is an end view of an ordinary pipe of the locking-bar type. Fig. 2 shows a side view of two adjacent pipes joined in accordance with this invention. Fig. 3 is a section, on an enlarged scale, of two adjacent pipes with the external ends of the locking-bars planed down and undercut, the section being taken on the line 1 2 of Fig. 1. Fig. 4 is an end view of a locking-bar, the hatched portion showing the part of the locking-bar that is cut away to receive the collar. It will be seen that portions of the bulbs on the pipe-plates have also been removed; but as this part will be covered by the collar it is anticipated that the joint will be in nowise weakened. Fig. 5 is a plan view of Fig. 3. Fig. 6 is a similar view, but with the collar in place and wedged up. The locking-bar to the right is shown swaged or beaten down onto the wedge, while the locking-bar to the left is wedged, but not swaged. Fig. 7 is a side elevation of Fig. 6. Fig. 8 is a vertical section of the same; but the locking-bar to the left is swaged.

$a$ and $b$ are the ends of two adjacent pipes of the locking-bar type. The external ends of the locking-bars $c$ are planed down flush with the external surface of the pipes and slightly undercut, so as to form a seat or recess in which a collar or band can rest, as shown in Figs. 3, 4, 5, and 6. The adjacent ends of the pipes $a$ and $b$ are inserted into the collar $d$, which is riveted by rivets $d'$ to the ends of the pipes it envelops. Into the spaces between the undercut ends of the locking-bars $c$ and the edges of the collar $d$ wedges $e$ are driven and the undercut ends of the locking-bars beaten down or swaged, so as to partially envelop the wedges, as shown to the right in Figs. 6 and 7. The exposed edges of the collar or those parts which lie between the locking-bars is then calked in the same manner as is usually practiced by boiler-makers when calking the seams of boilers.

Having now particularly described and ascertained the nature of my said invention and in what manner the same is to be performed, I declare that what I claim is—

1. In joints for locking-bar pipe, pipe-sections having locking-bars formed with recesses in the external ends of the same, an annular band fitting around the ends of said pipe-sections, and wedges between the recessed ends of the locking-bars and said band.

2. In joints for locking-bar pipe, pipe-sections having locking-bars formed with recesses adjacent the ends of the sections, an annular band engaging said recesses and forming an annular seam with the external surface of the pipe-sections and calking material in said annular seam.

3. In joints for locking-bar pipe, pipe-sections having locking-bars formed with recesses adjacent the ends of the sections, and a band engaging said recesses.

4. In joints for locking-bar pipe, a pipe-section having locking-bars formed with recesses adjacent the end of the section and a band engaging the end of said pipe-section in said recesses.

5. In joints for locking-bar pipe, a pipe-section having locking-bars formed with recesses adjacent the end of the section, a band engaging the end of said pipe-section and the reduced ends of said locking-bars and securing means to hold said reduced ends of said locking-bars to said band.

6. In joints for locking-bar pipe, a pipe-section having locking-bars formed with recesses adjacent the end of the section, a band engaging the end of said section and riveted thereto, the reduced ends of said locking-bars being riveted to said band.

In witness whereof I have hereunto set my hand in presence of two witnesses.

GEORGE J. HOSKINS.

Witnesses:
MANFIELD NEWTON,
T. ORMOND O'BRIEN.